(12) United States Patent
Barrett

(10) Patent No.: US 8,249,026 B2
(45) Date of Patent: Aug. 21, 2012

(54) SCHEDULING OF DATA PACKETS OVER AN AIR INTERFACE OF A CELLULAR COMMUNICATION SYSTEM

(75) Inventor: Stephen John Barrett, Curridge (GB)

(73) Assignee: Motorola Mobility, Inc., Libertyville, IL (US)

( * ) Notice: Subject to any disclaimer, the term of this patent is extended or adjusted under 35 U.S.C. 154(b) by 315 days.

(21) Appl. No.: 12/679,507

(22) PCT Filed: Sep. 18, 2008

(86) PCT No.: PCT/US2008/076777
§ 371 (c)(1),
(2), (4) Date: Mar. 23, 2010

(87) PCT Pub. No.: WO2009/055167
PCT Pub. Date: Apr. 30, 2009

(65) Prior Publication Data
US 2010/0202418 A1    Aug. 12, 2010

(30) Foreign Application Priority Data

Oct. 24, 2007    (GB) .................................. 0720876.2

(51) Int. Cl.
*H04W 4/00* (2009.01)
(52) U.S. Cl. .................... 370/332; 455/403; 455/422.1; 455/450

(58) Field of Classification Search ........... 370/310–350
See application file for complete search history.

(56) References Cited

U.S. PATENT DOCUMENTS

| 2004/0072556 | A1* | 4/2004 | Frantti et al. | 455/404.2 |
| 2007/0042720 | A1 | 2/2007 | Pan et al. | |
| 2007/0153801 | A1* | 7/2007 | Sung et al. | 370/395.4 |
| 2007/0286068 | A1* | 12/2007 | Helmersson et al. | 370/216 |
| 2010/0097949 | A1* | 4/2010 | Ko et al. | 370/252 |

FOREIGN PATENT DOCUMENTS

| EP | 1509053 A1 | 2/2005 |
| EP | 1718002 A1 | 11/2006 |
| JP | 2007060723 | 3/2007 |

* cited by examiner

*Primary Examiner* — Charles C Jiang

(57) ABSTRACT

A scheduler (105) for scheduling data packets over an air interface of a cellular communication system comprises a coherence time processor (213) which determines a coherence time for a user equipment (101, 103). A scheduling unit (205) then schedules at least a first data packet for the user equipment (101, 103) in response to the coherence time. In some embodiments, the system may use a retransmission scheme and a scheduling which depends on a time varying propagation characteristic. In such embodiments, an available delay may be allocated to retransmissions or propagation dependent scheduling dependent on the coherence time. The scheduler may e.g. be implemented in a base station.

9 Claims, 5 Drawing Sheets

SCHEDULING OF DATA PACKETS OVER AN AIR INTERFACE OF A CELLULAR COMMUNICATION SYSTEM

FIELD OF THE INVENTION

The invention relates to scheduling of data packets over an air interface of a cellular communication system and in particular, but not exclusively, to scheduling of data packets in a $3^{rd}$ Generation cellular communication system.

BACKGROUND OF THE INVENTION

3rd generation cellular communication systems, such as the Universal Mobile Telecommunication System (UMTS), have been specified to provide a large number of different services including efficient packet data services. For example, downlink packet data services are supported within the $3^{rd}$ Generation Partnership Project (3GPP) release 5 Technical Specifications in the form of the High Speed Downlink Packet Access (HSDPA) service.

In cellular communication systems, the air interface resource is typically the limiting factor for the achievable capacity of the system and therefore it is of the utmost importance that this is used efficiently. It is therefore important that the scheduling of data packets results in an efficient utilisation of the available resource and significant research and development has been undertaken in order to find reliable, practical and efficient scheduling algorithms.

A Radio Network Controller (RNC) is responsible for allocating air interface resources to each base station in the form of one or more scrambling codes. The RNC will also typically allocate a set of spreading codes that can be used by the base station for carrying HSDPA. The base station (Node B) is then responsible for the scheduling of HSDPA data packets over the air interface and specifically for allocating the codes to the individual data packets or mobile stations. For example, the individual base station is responsible for scheduling HS-DSCH (High Speed—Downlink Shared CHannel) transmissions to the mobile stations that are attached to it, for operating a retransmission scheme on the HS-DSCH channels, for controlling the coding and modulation for HS-DSCH transmissions to the mobile stations and for transmitting data packets to the mobile stations.

In order to reduce the resource usage for HSDPA channels, scheduling is thus performed at the base station rather than at the RNC. This allows scheduling to be sufficiently fast to dynamically follow radio condition variations. For example, when more than one mobile station requires resource from the shared HSDPA channel, the base station may schedule data to the mobile stations experiencing favourable radio conditions in preference to the mobile stations experiencing less favourable conditions. Furthermore, the allocated resources and the coding and modulation applied to transmissions to mobile stations may be highly tailored to the current radio conditions experienced by the individual mobile station. Thus, the fast scheduling performed at the base station allows link adaptation and an efficient resource usage. HSDPA seeks to provide packet access techniques with a relatively low resource usage and with low latency. In addition to using base station based fast scheduling, HSDPA also makes use of other techniques in order to reduce the resource required to communicate data and to increase the capacity of the communication system. These techniques include Adaptive Coding and Modulation (AMC) and a retransmission scheme for lost data packets. In the retransmission scheme, which is referred to as ARQ or Hybrid ARQ (HARQ), the mobile station transmits feedback data in the form of uplink acknowledge (ACK) or non-acknowledge (NACK) messages which are used to determine whether individual data packets need to be retransmitted. If no ACK message is received for a given data packet, this data packet is retransmitted to the mobile station. In HARQ, soft combining of the different transmissions of the data packet is used at the mobile station in order to improve reliability and reduce the required transmit power.

A number of different scheduling mechanisms for cellular systems in general, and HSDPA in particular, have been proposed in the prior art. The most advanced and best performing schedulers tend to be schedulers known as Proportional Fair (PF) schedulers, which perform the scheduling taking into account both channel conditions and achieved throughput fairness. Thus, the PF schedulers seek to provide a reasonable distribution of resources between different users while ensuring that the air interface resource is efficiently used. However, such schedulers are primarily designed for scheduling of streaming traffic and best effort data packet services for which the delay budget is relatively large.

Accordingly, they tend to introduce a variable and potentially large delay. However, an increasing number of communication services are aimed at communication services that have a very specific delay requirement. For example, Voice over Internet Protocol (VoIP) services require the delay to be relatively short resulting in a requirement of the scheduling delay being less than typically a few ten's of milliseconds (ms). Conventional schedulers tend not to be optimum for such services and typically result in reduced radio resource utilisation efficiency and/or longer delays.

Hence, an improved scheduling would be advantageous and in particular a scheduling allowing increased flexibility, reduced scheduling delay, efficient resource utilisation and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention, there is provided a scheduler for scheduling data packets over an air interface of a cellular communication system, the scheduler comprising: means for determining a coherence time for a user equipment; and scheduling means for scheduling at least a first data packet for the user equipment in response to the coherence time.

The invention may provide improved scheduling in many embodiments and/or scenarios. In particular, the invention may e.g. allow a dynamic and improved trade-off between scheduling delay and resource usage. For example, the first data packet may, dependent on the coherence time be delayed until propagation conditions have improved. For example, in some embodiments the first data packet may be delayed until propagation conditions improve if the coherence time is below a given threshold but may be transmitted at a time without consideration of the propagation conditions if the coherence time is above a given threshold. Thus, the scheduling takes into account how fast the propagation environment may change thus e.g. taking into account the probability of the propagation environment changing within a given time interval available for the scheduling of the first data packet.

The coherence time may be an indication of a rate, speed or frequency of change of the propagation characteristics of the air interface communication channel used to transmit or receive the first data packet from the user equipment. The coherence time may be indicative of how fast the propagation environment changes for the user equipment and may indicate or be dependent on a speed of the user equipment.

The cellular communication system may be any system comprising at least one cell wherein user equipments are served by a centralised communication station with the communication of the centralised communication station for at least a plurality of user equipments is scheduled together by the scheduler. The centralised communication station may specifically be a base station or access point and the cellular communication system may e.g. be a UMTS, HSDPA, Long Term Evolution (LTE) or Wireless Local Area Network (WLAN) system.

The invention may be applicable to both the uplink and downlink of a cellular communication system.

According to another aspect of the invention, there is provided base station for a cellular communication system comprising: a scheduler comprising: means for determining a coherence time for a user equipment, and scheduling means for scheduling at least a first data packet for the user equipment in response to the coherence time; and a transmitter for transmitting the first data packet to the user equipment over an air interface communication channel.

According to another aspect of the invention, there is provided method of scheduling data packets over an air interface of a cellular communication system, the method comprising: determining a coherence time for a user equipment; and scheduling at least a first data packet for the user equipment in response to the coherence time.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a Universal Mobile Telecommunication System (UMTS) cellular communication system and in particular to a UMTS system comprising functionality required or desired to support a High-Speed Downlink Packet Access (HSDPA) communication service. However, it will be appreciated that the invention is not limited to this application but may be applied to many other cellular communication systems including for example Wireless Local Area Networks (WLAN), IEEE 802.11x systems etc.

Indeed it will be appreciated that except for some HSDPA specific details, the following description will be compatible with any system wherein a central scheduler is used to schedule data packets for a plurality of users served by a centralised communication unit (such as a base station or a wireless access point).

Figure 1:
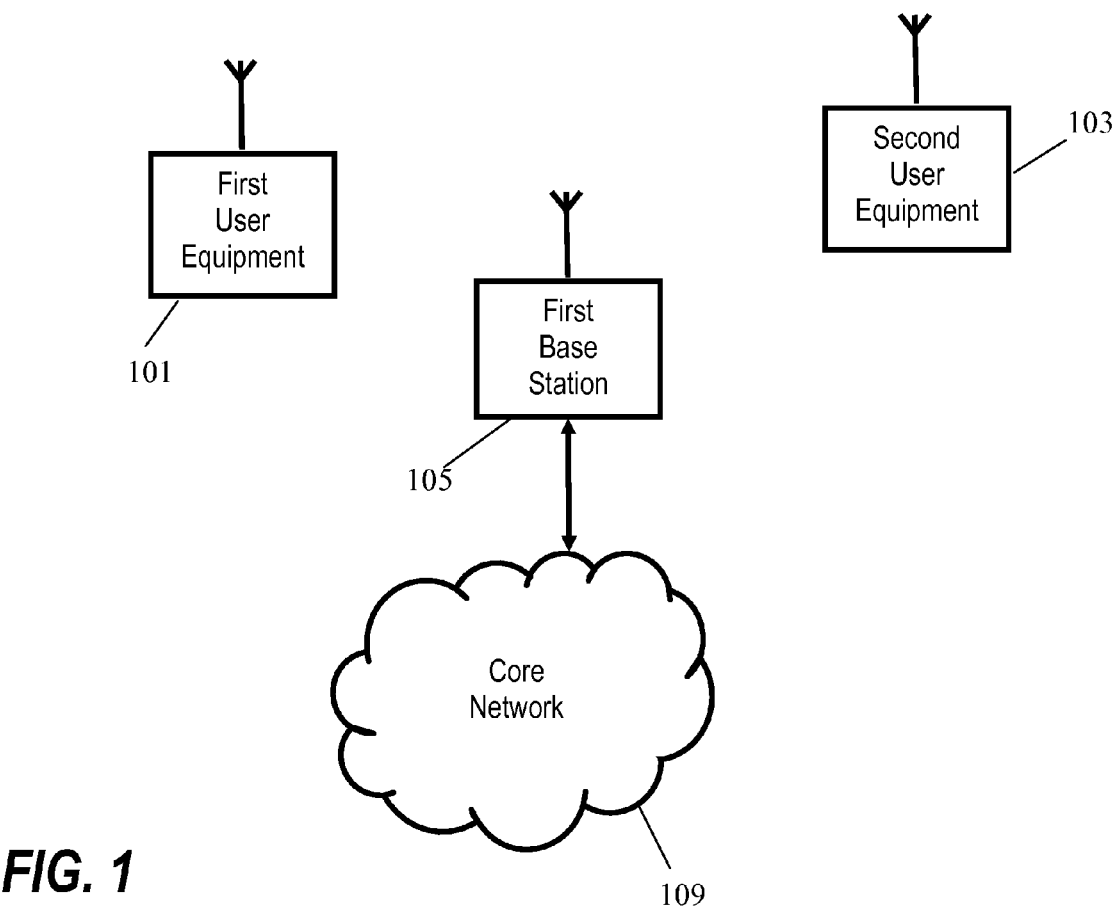
FIG. 1 is an illustration of a cellular communication system in accordance with some embodiments of the invention.

The following description focuses on a downlink embodiment wherein data packets are scheduled for transmission from a base station to user equipments. However, it will be appreciated that the principles described are also applicable to an uplink embodiment wherein data packets are scheduled for transmission from user equipments to the base station. Specifically, it will be appreciated that the described principles may also be applied to e.g. a High-Speed Uplink Packet Access (HSUPA) communication service FIG. 1 illustrates an example of a cellular communication system in accordance with some embodiments of the invention.

The cellular communication system is a GSM/UMTS cellular communication system which supports a plurality of user equipments. In the example two user equipments 101, 103 supported by a base station 105 are shown but it will be appreciated that a typical cellular communication system will support a large number of user equipments. A user equipment may be any communication entity capable of communicating with a base station (or access point) over the air interface including e.g. a mobile phone, a mobile terminal, a mobile communication unit, a remote station, a subscriber unit, a 3G User Equipment etc.

The base station 105 is coupled to a GSM/UMTS network 109 which represents all aspects of the fixed segment of the GSM/UMTS communication system including other base stations, Radio Network Controllers, Mobile Switching Centres etc as will be well known to the person skilled in the art.

In the system, the user equipments 101, 103 are actively involved in HSDPA services. Specifically, the user equipments 101, 103 use HSDPA services to support a Voice over Internet Protocol (VoIP) speech communication. Thus, VoIP HSDPA data packets for the user equipments 101, 103 are scheduled by an HSDPA scheduler located in the first base station 105.

Figure 2:
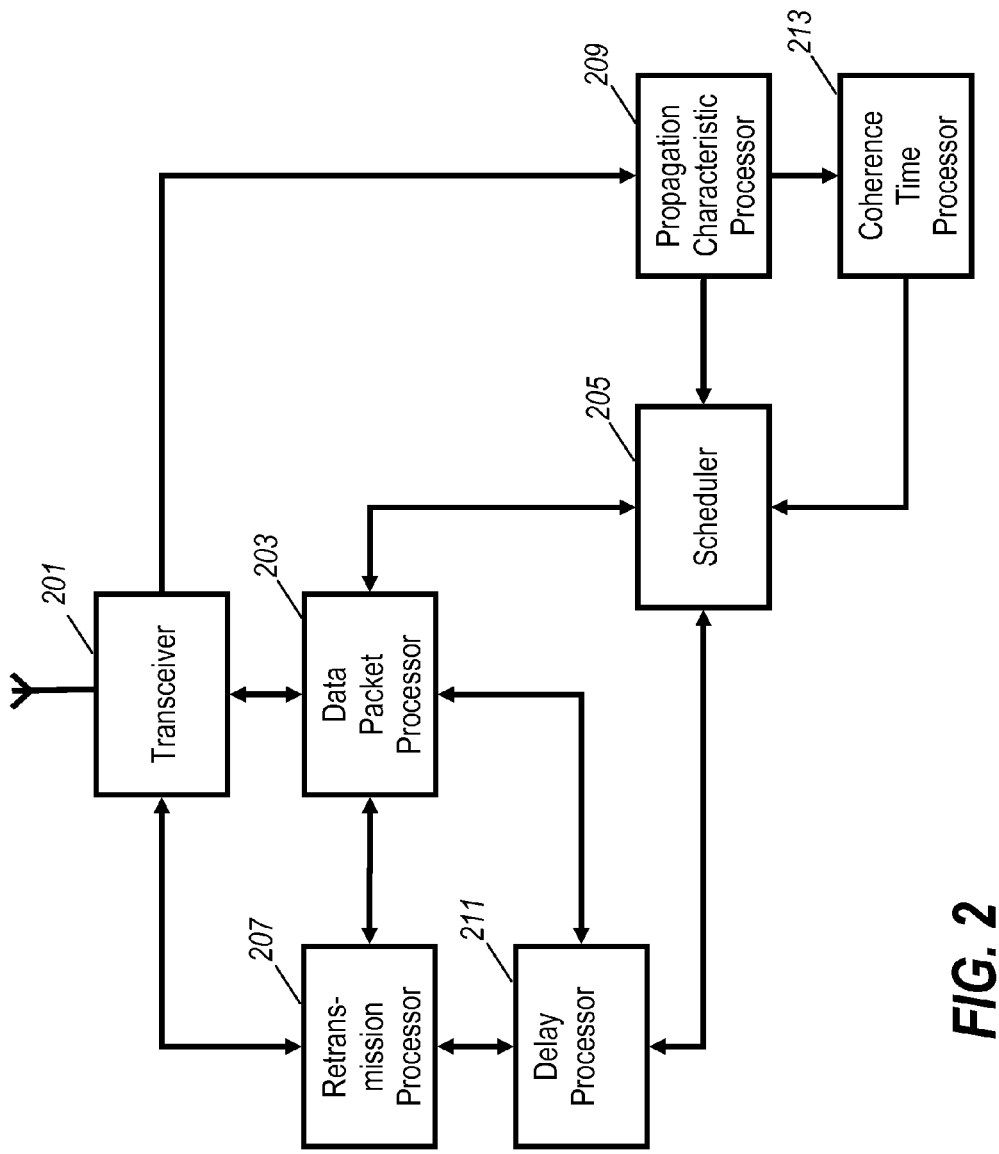
FIG. 2 is an illustration of a base station in accordance with some embodiments of the invention.
Figure 5:
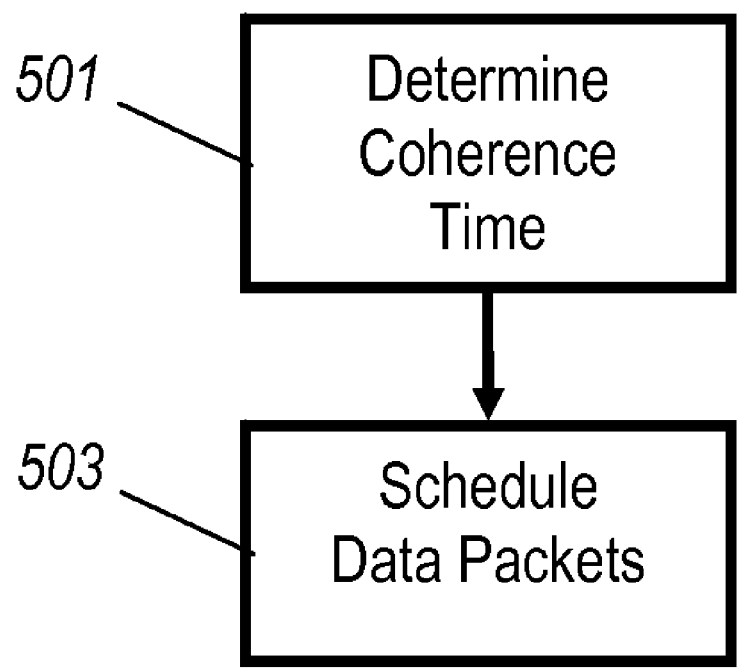
FIG. 5 illustrates an example of a method of scheduling data packets over an air interface of a cellular communication system.

FIG. 2 illustrates the first base station 105 in more detail. It will be appreciated that FIG. 5 illustrates only elements necessary for the following description and that a typical base station may comprise other required or desired functionality.

The base station comprises a transceiver 201 which is capable of transmitting and receiving data over the air interface communication channels established with user equipments 101, 103 that are supported by the first base station 105. The transceiver 201 is also capable of transmitting and receiving control data over the air interface.

The transceiver 201 is coupled to a data packet processor 203 which stores and processes the data packets received from an RNC for transmission over the air interface. Specifically, the data packet processor 203 receives data for transmission over the air interface from the RNC supporting the base station 105 and stores them in the data packet processor 203 until a scheduling time interval in which the data packets are scheduled. The data packets are then fed to the transceiver 201 for transmission to the appropriate user equipments 101, 103.

The data packet processor 203 is coupled to a scheduler 205 which is arranged to schedule data packets for transmission over the air interface to the user equipments 101, 103. In the specific example, the scheduler 205 is an HSDPA scheduler that schedules data packets for the active HSDPA services. Thus the scheduler 205 schedules the VoIP data packets intended for the first and second user equipments 101, 103.

The first base station 105 furthermore comprises a propagation characteristic processor 209 which receives measurements of the downlink communication channels from the user equipments 101, 103.

In the specific example of an HSDPA system, the user equipments 101, 103 transmit uplink control information to the scheduling base station that can be used to determine the quality of the downlink HSDPA channel. Specifically, the individual user equipment 101, 103 transmits a Channel Quality Indicator (CQI) data which is indicative of the current propagation conditions for the individual user equipment 101, 103. Based on measurements of the received signal, the individual user equipment 101, 103 generates a CQI which may indicate a modulation scheme and data rate that is considered to be supportable by the air interface communication channel from the base station 105 to the individual user equipment 101, 103. In other embodiments, the user equipments 101, 103 may directly transmit a measure of the signal to noise plus interference ratio experienced by the individual user equipment 101, 103 for the downlink HSDPA transmissions.

Figure 3:
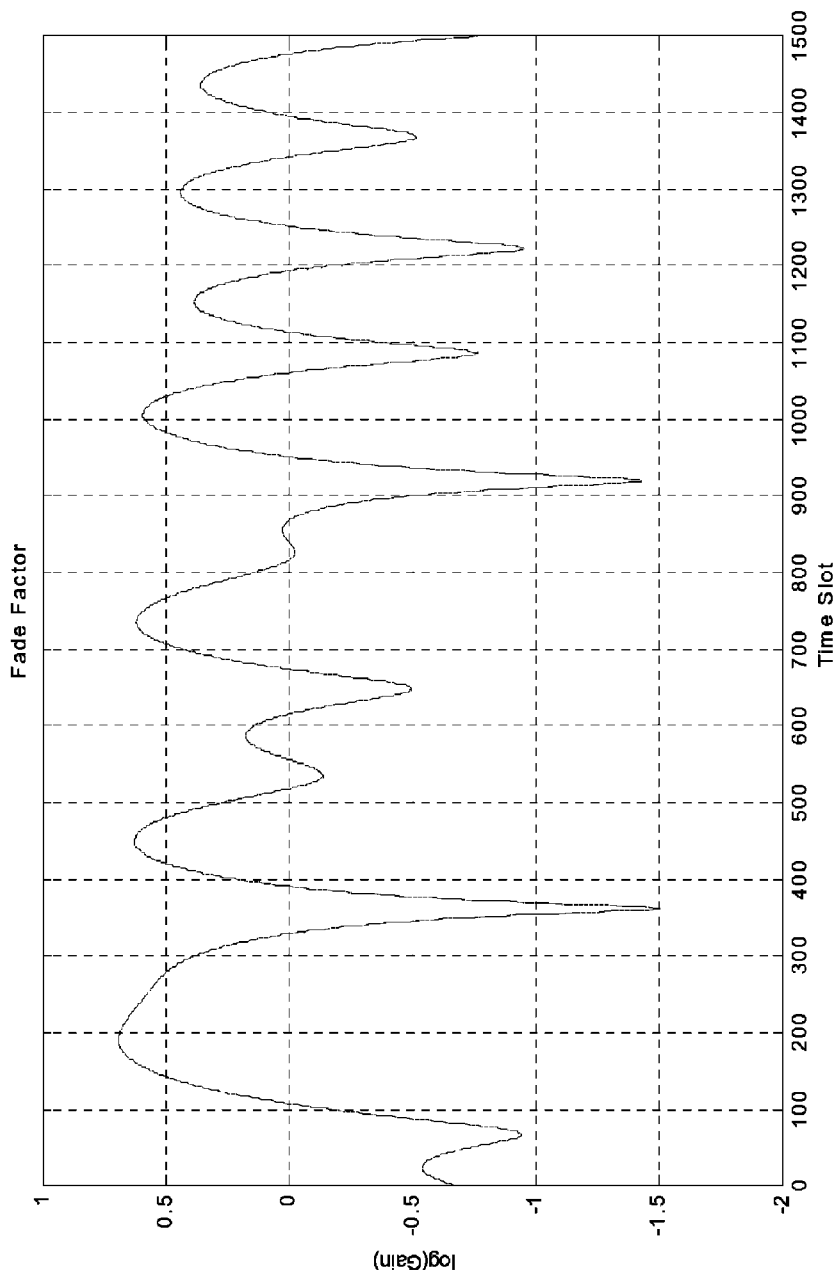
FIG. 3 is an illustration of a fade profile for a user equipment of a cellular communication system.

For a moving user equipment, the propagation channel from the base station 105 to the user equipment can vary quite fast and quite substantially. For example, FIG. 3 shows an example of a path loss variation for a moving HSDPA user equipment. FIG. 3 illustrates $\log_{10}$ (path gain) as a function of time slots of duration 0.666 msec for a user equipment moving at a speed of three km/h, with a channel having four paths, one of which is dominant.

As can be seen, the path loss varies substantially and substantial fades may be experienced which require an excessive transmit power in order to achieve a desired signal to noise ratio.

In order to reduce the resource usage, the received CQI data indicating the current quality of the propagation channels is taken into account by the scheduler 205 when scheduling data packets for the different user equipments 101, 103. In particular, the scheduler 205 will seek to schedule data packets for a specific user equipment 101 in frames (each 2 ms frame comprises three time slots) in which the propagation channel for that user equipment 101 has a high quality. Such an approach is also referred to as upfade riding and can substantially reduce the air interface resource usage.

HSDPA furthermore comprises a retransmission scheme which ensures that data packets which have not been received by the user equipments 101, 103 are retransmitted until they are correctly received.

Specifically HSDPA uses a Hybrid Automatic Repeat reQuest (HARQ) retransmission scheme for reducing the error rate. The user equipments 101, 103 receive the transmissions from the first base station 105 and perform an error check. When a data packet is successfully received, the user equipments 101, 103 transmit an acknowledge message (ACK message), if the data packet is received in error a non-acknowledgement message is transmitted (a NACK message) and if no data packet is detected no message is transmitted. If the first base station 105 receives a NACK message or does not receive any message from a user equipment 101, 103, it proceeds to retransmit the data packet. The retransmitted data can in a HARQ scheme be additional redundant data of the data packet or other information that can be combined with the earlier transmissions to increase the probability of correct detection.

Thus, the first base station 105 comprises a retransmission processor 207 which is coupled to the transceiver 201 and the data packet processor 203. When a data packet is transmitted by the transceiver, it is moved from the data packet processor 203 to the retransmission processor 207. The retransmission processor 207 then receives the ACK/NACK messages from the user equipment 101, 103. When an ACK message is received, the retransmission processor 207 proceeds to delete the corresponding data packet as this has been successfully transmitted to the appropriate user equipment 101, 103. However, if a NACK message is received or no message is received within a given time interval, the retransmission processor 207 feeds the data packet back to the data packet processor 203 such that the retransmission of the data packet can occur. A data packet being retransmitted may be different from the original data packet, e.g. in a HARQ system other redundant data for the data packet may be transmitted as will be well known to the skilled person.

The base station furthermore comprises a delay processor 211 which is coupled to the retransmission processor 207, the data packet processor 203 and the scheduler 205. The delay processor 211 is operable to determine and manage the delays of the data packets. For example, for each data packet the delay processor 211 may determine an allowable maximum delay which can be caused by the scheduling of the data packet without a total delay for the communication service supported by the data packet being exceeded. Thus, the delay processor 211 can determine a scheduling delay corresponding to the delay that may be introduced by the air interface scheduling. The scheduling delay typically includes the actual delays associated with the communication over the air interface including retransmission delays.

As an example, many communication services are subject to a maximum delay quality of service requirement. E.g. the maximum delay for a VoIP speech communication may be 250 msecs. This delay is a total delay involving all delays of the end-to-end communication and typically a delay budget is determined for each communication service. The delay budget allocates a maximum delay to the different operations involved in the end to end communication. Thus, the delay budget results in the allocation of a maximum scheduling delay to the air interface scheduler. For example, the delay processor 211 can determine that for a VoIP service the scheduling delay must be less than thirty msecs, i.e. that the maximum allowable delay for the scheduler 205 is thirty ms.

In some embodiments, the maximum allowable delay for the scheduler 205 is predetermined and a fixed maximum scheduling delay is defined for each communication service.

In the example, the delay processor 211 also determines delay characteristics of the retransmission operation. For example, the delay processor 211 may determine a typical or maximum delay associated with retransmitting a data packet. It will be appreciated that as for the determination of the maximum allowable delay, the determination of a retransmission delay characteristic may also be based on a static predetermined (worst-case) retransmission delay or may be dynamically determined in response to measurements of current retransmission delays.

The scheduler 205 is arranged to perform the scheduling of the data packets in response to the delay characteristics received from the delay processor 211. Specifically, the scheduler 205 can schedule the data packets such that the allocated scheduling delay is not exceeded for the data packets, i.e. the data packets are scheduled such that the delay requirement for the individual data packet is met. This may for example be achieved by allocating a priority to each data packet with the probability of higher prioritised data packets being transmitted in the current scheduling interval being higher than for lower prioritised data packets. The prioritisation of a given data packet is adjusted in response to the remaining available delay, i.e. as a delay of a data packet approaches the allowable scheduling delay, the scheduler 205 may increase the priority of the data packet in order to increase the probability that it is scheduled within the allocated delay.

Thus, the scheduler 205 schedules the data packets taking into account both the current propagation characteristics (e.g. fade characteristics) for each user equipment and the delay for each data packet. This scheduling inherently involves a trade off as the resource usage may be reduced at the expense of an increased delay by delaying the scheduling of the data packet until the propagation conditions for the corresponding user equipment improves.

In the first base station 105, the scheduling is furthermore performed in response to a coherence time for the user equipment 101 to which the data packet is to be transmitted. Accordingly, the first base station 105 comprises a, coherence time processor 213 coupled to the propagation characteristics processor 209 and the scheduler 205.

The coherence time processor 213 is operable to determine a coherence time for the user equipment. In contrast to the propagation characteristic processor 209, the coherence time processor 213 does not determine a current propagation parameter, such as a fading parameter, of the propagation channel but rather determines how fast the parameter(s) is(are) changing. Thus, the coherence time determined by the coherence time processor 213 does not reflect a current quality of the propagation channel but rather a speed or frequency of change of the quality of the propagation channel. The coherence time can be used to give an indication of the period of time over which the channel conditions can be considered to be broadly similar.

The coherence time of a propagation channel is related to a quantity known as the Doppler spread of the channel. When a user equipment (or reflectors in its environment) is moving, the user equipment's velocity causes a shift in the frequency of the signal transmitted along each signal path. This phenomenon is known as the Doppler shift. Signals traveling along different paths can have different Doppler shifts, corresponding to different rates of change in phase. Since the instantaneous channel gain depends on whether signal components add constructively or destructively the size of the Doppler spread determines the duration over which the channel impulse response is essentially invariant, in other words it will determine the coherence time.

In general, coherence time is inversely related to Doppler spread, typically expressed as:

$$T_C = \frac{k}{D_S}$$

where $T_c$ is the coherence time, $D_s$ is the Doppler frequency/spread (given by velocity of the user equipment divided by radio frequency wavelength), and k is a constant taking on values in the range of 0.25 to 0.5. In the specific example, the coherence time can e.g. be determined as equal to 0.423 divided by the maximum Doppler frequency.

The factor of 0.423 is an often used value which originates from a definition of coherence time as the root of 9/(16×PI× Fd×Fd) (where Fd is the Doppler frequency), which is the geometric mean of two other commonly used definitions of coherence time, the first of which is that the coherence time is roughly 1/Fd and the second of which is the time over which the time correlation function is greater than 0.5, which is given by 9/(16×PI×Fd) (Ref. e.g. Theodore S Rappaport, "Wireless communications principle and practice", Prentice Hall, 1996).

The coherence time processor 213 determines the coherence time from the CQI measurements reported from the user equipments 101, 103. Specifically, the coherence time processor 213 can estimate the average duration between deep fades. This can be achieved, for example, by differentiating estimates of received Ec/No. Estimates of received Ec/No can be determined from CQI values, since CQI is a proxy for received channel quality. Where there is a peak in the differentiated vector (corresponding to a rapid change in gradient from negative to positive) this is an indication of a fade. The duration between fades can be determined using a peak detector and a circuit for measuring the period between peaks. An average of this inter-fade timing can be formed over the last few inter-fade intervals (i.e. an average can be made over a time window).

In the example, the scheduler 205 is arranged to schedule the data packets in response to the determined coherence time. In some embodiments, the coherence time may simply be included as another factor which is taken into account when determining the relative priority of the data packet. For example, data packets for a user equipment having a high coherence time may be allocated a higher priority than data packets of user equipments having a low coherence time thereby resulting in data packets having a high coherence time being scheduled in advance of data packets having a lower coherence time.

In the specific example, the coherence time is used to adjust the trade off between reducing resource usage and reducing delays. For example, the scheduling may be in response to a time varying propagation characteristic determined by the propagation characteristics processor 209 (e.g. a current path loss value or a fade characteristic) and in response to a delay associated with the communication of the data packets (e.g. a delay which is incurred by the scheduling and transmission of the data packet over the air interface).

E.g. the scheduler 205 can rank all data packets available for scheduling in response to a scheduling cost measure which includes a cost contribution reflecting the resource usage cost for transmitting the data packet in the current scheduling interval (which depends on the current propagation characteristics) and a cost contribution reflecting delay cost for transmitting the data packet in the current scheduling interval (which can e.g. depend on the desired delay and which can increase the longer the data packet has waited for scheduling). The relative weights of the resource cost contribution and the delay cost contribution can then be adjusted in response to the coherence time.

For example, for a very high coherence time, it is unlikely that the channel will change within the available scheduling interval and therefore it is unlikely that the resource usage will be substantially reduced by delaying the data packet. Therefore, a high weight of the delay cost contribution and a low weight of the resource cost contribution may be set for the data packet. Conversely, for a low coherence time, it is highly likely that the channel will change within the available scheduling interval and therefore it is likely that the resource usage will be substantially reduced by delaying the data packet until propagation conditions improve and it is unlikely that the delay would need to be very long. Therefore, a low weight of the delay cost contribution and a high weight of the resource cost contribution may be set for the data packet.

It will be appreciated that the individual cost contributions can be dependent on many different factors and characteristics such as the current propagation conditions, the remaining allowable delay for a data packet, the characteristics of the specific communication service etc.

Thus, the consideration of the coherence time in the scheduling performed by the scheduler 205 can provide an improved scheduling and in particular can provide an improved trade off between delay and resource usage for the communication of the data packets over the air interface. Thus, the described approach may increase the capacity of the whole communication system and/or improve the quality of service of the supported communication services.

In the following a specific example will be described wherein the coherence time is used by the scheduler to prioritise between delay and resource usage for a data packet wherein retransmission is used for data packets. Specifically, in the example a retransmission characteristic in the form of a retransmission delay is taken into account.

In the example, if the scheduler 205 determines that the coherence time of a given user equipment 101 is sufficiently short relative to the delay budget available (i.e. the available scheduling delay) then the scheduling is performed taking into account the current propagation characteristics. Specifically, upfade riding is used so that a data packet may be delayed until the propagation conditions meet a given criterion. The scheduler would then make use of the available scheduling delay to wait for (what it estimates) to be an upfade to occur before scheduling the packet. On the other hand, if the coherence time is long relative to the available delay budget, it is unlikely that the propagation conditions will change substantially and therefore the retransmission mechanism is relied upon. Thus, in this case it is desirable to schedule the data packets such that any retransmissions can occur within the available delay. Thus, the scheduler 205 will in this case transmit the data packet straightaway to increase the likelihood that any retransmissions occur within the available delay.

Accordingly, in the example, for a low coherence time the available delay is used to perform upfade riding in order to reduce resource usage and for a high coherence time the available delay is used for potential retransmissions thereby reducing the delay when retransmissions are used. Also, the example can provide an improved exploitation of the radio resource efficiency benefits achievable with the HARQ and upfade riding mechanisms. For example, by transmitting a data packet for a user equipment with a high coherence time such that there is sufficient time for one or more retransmissions, the transmit power for that data packet can be reduced as any increased risk of the data packet not being successfully received can be compensated by the option of one or more retransmissions. Thus, a reduced radio resource usage is achieved and the example specifically allows an improved trade-off between the radio resource benefits that can be achieved by the upfade riding approach and the retransmission approach.

Thus, for a high coherence time, it is likely that the data packet is scheduled for the first time shortly after it has arrived at the base station and irrespective of current radio conditions thereby providing a sufficient delay budget for a re-transmission to occur should it be necessary.

Figure 4:
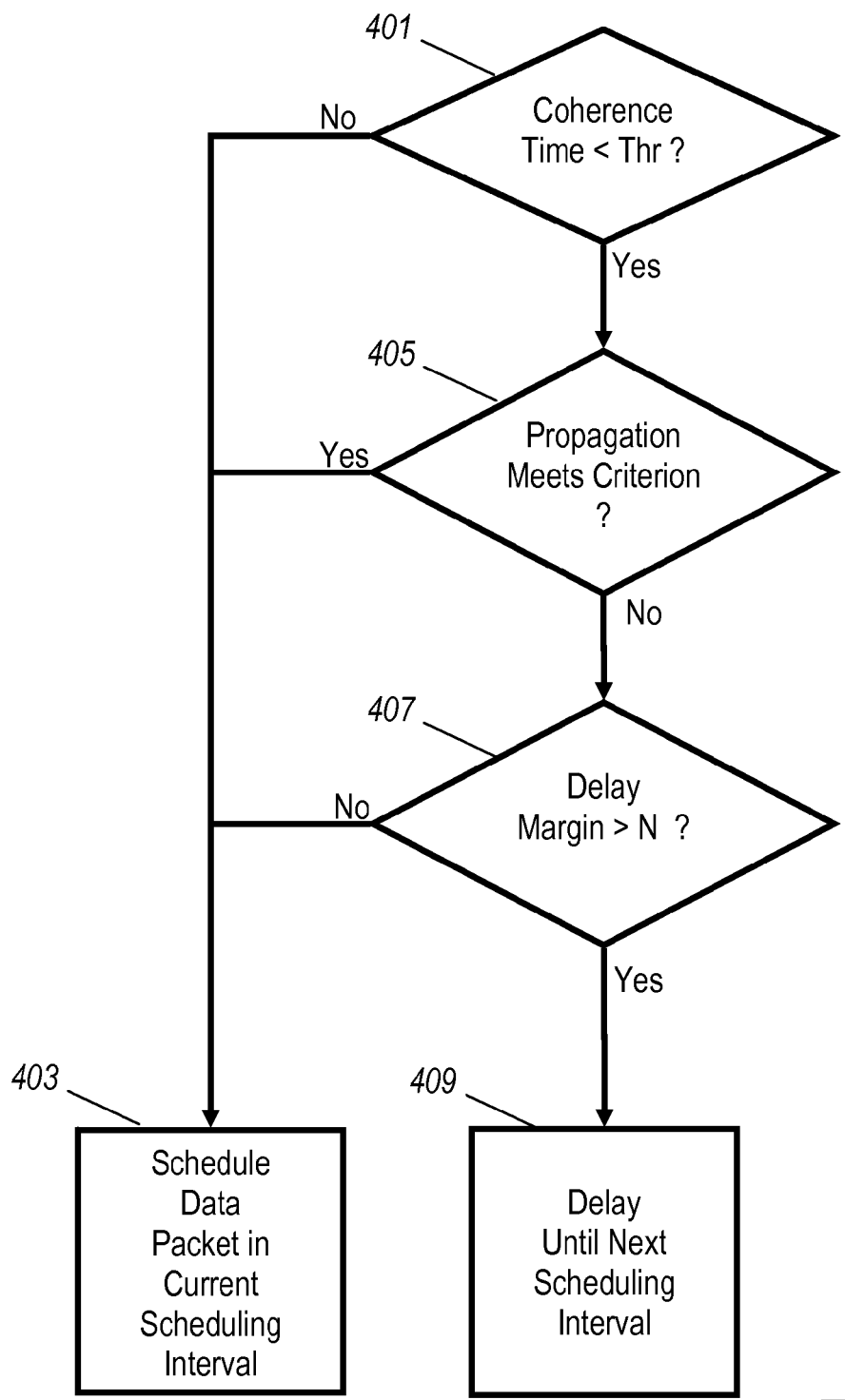
FIG. 4 illustrates an example of a method of scheduling data packets over an air interface of a cellular communication system.

FIG. 4 illustrates an example of a method of scheduling that may be used by the scheduler 205 in accordance with such an example. The shown method may be performed for each data packet and scheduling interval.

The method starts in step 401 wherein it is determined if the coherence time meets a first criterion. The first criterion may simply consist in a requirement that the coherence time is less than a given value. If the criterion is met, the available delay will be allocated to upfade riding and if the criterion is not met the available delay will be used to allow possible retransmissions.

As a coarse example, the delay budget available to the scheduler for a VoIP service may be twenty msec. As a reasonable estimate, in order for there to be a high probability of finding an upfade in a twenty msec interval, there must be one complete fading cycle corresponding to a coherence time of ten msec. Hence, in the specific example, the first criterion may simply be a requirement that the coherence time is less than ten msec.

It will be appreciated that the exact threshold may depend on the specific characteristics of the individual embodiments and it has been found that particularly advantageous performance and trade off between delay and resource usage and/or between radio resource benefits of using upfade riding relative to retransmission is typically found for thresholds between around ten to fifty msecs.

It will be appreciated that the coherence time may be determined in response to (or be represented by) a speed of the user equipments 101, 103. Thus, step 401 may in some embodiments simply determine if a speed of the user equipment 101 meets a given requirement. For example, the coherence time is given by 0.423 divided by the maximum Doppler frequency.

For a typical frequency of 2 GHz, the wavelength is 0.15 meters and accordingly the Doppler frequency is given as $v/0.15$ where v is the speed of the user equipment (in meters/second). Thus, the speed v corresponding to a coherence time of ten msec can be found as 6.34 m/s=22.8 km/h. Thus, step 401 may simply evaluate if the speed of the user equipment 101 is below 22.8 km/h. The speed may e.g. be determined in response to accurate location estimates for the user equipment 101 (or can be directly reported by the user equipments 101, 103).

If the first criterion is not met, it is unlikely that the propagation conditions will change in the time allocated to the scheduler 205. Accordingly, the available delay is preferably used for retransmissions rather than to wait for an upfade to occur. The method therefore continues in step 403 wherein the data packet is scheduled within the current scheduling interval.

Thus, if the coherence time is higher than ten ms, the schedule 205 proceeds to schedule the data packet independently of the current propagation characteristics. Hence, the instantaneous propagation characteristics are not taken into account when determining the time at which the data packet needs to be sent but rather an early scheduling of the data packets is performed in order to provide additional time for any retransmissions that may occur.

It will be appreciated, that although the method illustrated in FIG. 4 simply schedules the data packet within the current scheduling interval if the coherence time is above the given threshold, more complex scheduling may be performed in other embodiments.

For example, the scheduler 205 may in addition consider the delay requirement for the data packet, the remaining available delay for the scheduler and/or a retransmission characteristic.

As a specific example, the scheduler 205 may from the delay processor 211 receive an indication of the maximum scheduling delay for the data packet as well as a typical or maximum retransmission time associated with the data packet. The scheduler 205 may then subtract the current incurred scheduling delay from the maximum scheduling delay to calculate a remaining available delay. It can then subtract the retransmission time from this remaining available delay to determine a delay margin that would still allow the maximum scheduling delay to be met even if the retransmission occurs. If this delay margin exceeds a scheduling interval, the scheduler 205 may choose to delay the scheduling of the data packet until the following scheduling interval.

If the coherence time meets the first criterion, step 401 is followed by step 405 wherein the scheduler 205 evaluates if a time varying propagation characteristic meets a second criterion. Specifically, the scheduler 205 determines whether the communication channel to the user equipment 101 to which the data packet is to be transmitted currently has a required quality. As a simple example, the scheduler can simply determine whether the current path loss for the communication channel is less than a given threshold (or e.g. that the signal to noise ratio is above a given threshold).

If the criterion is met, the scheduler 205 considers that the data packet can be transmitted to the user equipment 101 with sufficiently low resource usage and accordingly the method continues in step 403 wherein the data packet is scheduled within the current scheduling interval.

If the propagation criterion is not met in step 405, the method continues in step 407 wherein the currently introduced scheduling delay is considered. Specifically, it is evaluated if the remaining allowable delay (given as the difference between the allocated scheduling delay and the scheduling delay which has already been used) for the data packet meets a third criterion which specifically can be a requirement that the remaining allowable delay is above a scheduling time interval.

If so, the data packets need not be scheduled in the current scheduling interval and the method accordingly proceeds in step 409 wherein the data packet is delayed for the next scheduling interval. However, if the requirement is not met the data packet must be scheduled in this scheduling interval in order for the delay requirement for the communication service to be met. Accordingly, the method continues in step 403 wherein the data packet is scheduled in the current scheduling interval.

It will be appreciated, that the criterions used to determine the performed scheduling can be fixed, static and predetermined criterions or may be dynamically determined in response to various parameters and characteristics.

For example, the propagation criterion used in step 405 may be determined in response to a remaining allowable delay for the data packet. E.g., as the data packet is further delayed in each scheduling interval, the quality of the propagation channel required for the data packet to be transmitted in the current scheduling interval is reduced thereby providing a gradually changing trade off between the resource use and the delay. This trade off can reflect the fact that the probability of the propagation channel changing to a sufficiently high quality reduces as the time available to wait for this to happen reduces.

Specifically, if the remaining allowable delay falls below the duration of a scheduling interval, the propagation criterion may be reduced to be met by any value of the propagation characteristic thereby ensuring that the data packet is scheduled in the current scheduling interval. Thus, the operation of step 405 and step 407 may be combined into a single evaluation of a dynamic criterion.

The described operation of the scheduler thus provides a system wherein a data packet is scheduled in response to a time varying propagation characteristic of an air interface communication channel only if the coherence time meets a first criterion. Otherwise, the scheduling seeks to schedule the data packet as early as possible in order to provide more time for potential retransmissions.

The specific method solves the problem of how to use the available delay budget most effectively. The method specifically selects between the use of the available delay for either retransmission or upfade scheduling based on information gathered concerning each user equipments coherence time.

It will be appreciated, that although the specific method evaluates different criterions in order to select the data packets for scheduling in the current scheduling interval, more flexible and subtle approaches may be used in other embodiments. For example, the priorities of individual data packets may be modified in accordance with the outcome of the evaluations of the criteria.

In some embodiments, the scheduler 205 may not only determine whether the data packet is transmitted in a given scheduling interval but may also allocate a transmit power to the data packet.

The transmit power may be allocated in dependence on different parameters and may specifically be set dependent on whether the scheduling delay is allocated to fade upriding or retransmissions.

For example, a transmit power resulting in a higher probability of correct reception by the user equipment may be set if the coherence time meets the first criterion in step 401 than if the coherence time does not meet the first criterion. Specifically, the transmit power can be set such that a high signal to noise ratio is achieved at the user equipment if the coherence time meets the first criterion than if it does not. Thus, a relatively higher transmit power is used if the available delay is used for upfade riding rather than for retransmissions. As the delay of the data packets associated with upfade riding can result in there being insufficient time for any retransmissions, this can ensure that the risk of such retransmissions being necessary being reduced when upfade riding is used.

Furthermore, the approach may allow an efficient trade-off between the resource usage benefits of the upfade riding approach and the retransmission approach. Specifically, for low coherence times, the upfade riding may allow a low transmit power as transmission is made when radio conditions are good and for high coherence times, the retransmission scheme is used to set a low transmit power as any decoding failure can be remedied by a retransmission.

As another example, the transmission power may be set dependent on a retransmission characteristic for the data packet. The retransmission characteristic can specifically be an indication of a number of previous transmissions of the data packet. Thus, if a data packet has not been retransmitted previously it can be sent at a transmit power that provides a desired probability of correct reception, e.g. that results in a desired signal to noise ratio at the user equipment. However, if the data packet has been previously transmitted, the HARQ approach allows for the retransmission to be combined with the previous transmission therefore requiring a lower signal to noise ratio to achieve a given detection probability. Thus, the transmit power may be reduced if the data packet is a retransmission of a previously transmitted data packet.

FIG. 5 illustrates an example of a method of scheduling data packets over an air interface of a cellular communication system.

The method starts in step 501 wherein a coherence time is determined for a user equipment.

Step 501 is followed by step 503 wherein at least a first data packet for the user equipment is scheduled in response to the coherence time.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A scheduler for scheduling data packets over an air interface of a cellular communication system, the scheduler comprising:
   means for determining a coherence time for a user equipment; and
   scheduling means for scheduling at least a first data packet for the user equipment in response to a time varying propagation characteristic of an air interface communication channel of the user equipment if the coherence time is below a threshold;
   wherein the scheduling means is arranged to schedule the first data packet in response to a delay associated with communicating the first data packet; the scheduling means further being arranged to adjust a weighting of the time varying propagation characteristic and the delay in response to the coherence time.

2. The scheduler of claim 1 wherein the scheduling means is further arranged to schedule the first data packet in response to a delay requirement for the first data packet.

3. The scheduler of claim 1 wherein the scheduling means is further arranged to schedule the first data packet in response to a retransmission time characteristic for the first data packet.

4. The scheduler of claim 1 wherein, if the coherence time meets a first criterion, the scheduling means is arranged to delay scheduling of the first data packet until the time varying propagation characteristic meets a second criterion.

5. The scheduler of claim 1 wherein the scheduler further comprises power allocating means for allocating a transmit power to the first data packet for transmission to the user equipment, the power allocating means being arranged to allocate the transmit power such that it results in a higher probability of correct reception by the user equipment if the coherence time meets the first criterion than if the coherence time does not meet the first criterion.

6. The scheduler of claim 1 wherein the scheduler is arranged to schedule the first data packet within a time window which is independent of the time varying propagation characteristic if the coherence time does not meet the first criterion.

7. The scheduler of claim 1 further comprising means for determining the coherence time in response to channel quality indications received from the user equipment, the channel quality indications being indicative of a propagation characteristic for an air interface communication channel for the user equipment.

8. The scheduler of claim 1 wherein the cellular communication system employs a retransmission scheme for transmission of the first data packet to the user equipment, and wherein the scheduler further comprises power allocating means for allocating a transmit power to the first data packet for transmission to the user equipment, the power allocating means being arranged to allocate the transmission power dependent on a retransmission characteristic of the first data packet.

9. A method of scheduling data packets over an air interface of a cellular communication system, the method comprising:
   determining a coherence time for a user equipment; and
   scheduling at least a first data packet for the user equipment in response to a time varying propagation characteristic of an air interface communication channel of the user equipment if the coherence time is below a threshold;
   wherein the first data packet is scheduled in response to a delay associated with communicating the first data packet; the scheduling adjusting a weighting of the time varying propagation characteristic and the delay in response to the coherence time.

* * * * *